United States Patent [19]

Germerdonk et al.

[11] 4,144,313

[45] Mar. 13, 1979

[54] METHOD OF PURIFYING GASES BY COMBUSTION

[75] Inventors: Rolf Germerdonk, Bergisch-Gladbach; Götz-Gerald Börger, Monheim; Werner Hüning, Odenthal, all of Fed. Rep. of Germany

[73] Assignee: Bayer Aktiengesellschaft, Leverkusen, Fed. Rep. of Germany

[21] Appl. No.: 798,727

[22] Filed: May 19, 1977

[30] Foreign Application Priority Data

Jun. 4, 1976 [DE] Fed. Rep. of Germany ....... 2625139
Sep. 29, 1976 [DE] Fed. Rep. of Germany ....... 2643732

[51] Int. Cl.$^2$ .............................................. B01D 53/34
[52] U.S. Cl. ........................................ 423/210; 431/5; 431/10; 431/12; 423/245
[58] Field of Search ............... 423/210, 212, 245, 246; 23/277 C; 432/72; 431/5, 10, 12

[56] References Cited

U.S. PATENT DOCUMENTS 3,637,343  1/1972  Hirt ...................................... 423/210
3,841,824  10/1974  Bethel .............................. 423/212 X

*Primary Examiner*—Earl C. Thomas
*Attorney, Agent, or Firm*—Sprung, Felfe, Horn, Lynch & Kramer

[57] ABSTRACT

In the complete and safe purification of waste gases which contain organic or inorganic combustible substances by thermal decomposition at temperatures between about 800° C. and 1000° C., wherein the amount of waste gas supplied to an inlet varies in time within wide limits and also the concentration of oxygen and combustible substances varies in such a way that the lower explosion limit is at times exceeded in the waste gas and wherein supplementary fuel is optionally added for the maintenance of the decomposition temperature, the improvement which comprises (a) adding to the waste gas to be decomposed fresh air or waste gas which contains no combustible substances in a constant amount which maintains the incoming flow rate $W_o$ defined in FIG. 3 within the range of 3 and 20% by volume of the maximum amount of waste gas,
(b) rendering the flow of the waste gas mixture largely laminar and
(c) feeding this largely laminar flowing mixture of waste gases directly to a combustion chamber, possibly under distructing the inlet wall boundary layer at the inlet orifice.

If the variation in the amount of waste gas which is supplied at any given time is within specified safety limits, no fresh air or waste gas free of combustible substances need be supplied.

2 Claims, 3 Drawing Figures

METHOD OF PURIFYING GASES BY COMBUSTION

In various industrial operations waste gases are produced which contain noxious substances, for example solvent vapors, such as hexane, toluol, benzene, xylene, kerosene, ether, alcohol and/or combustible gases such as hydrogen, acetylene, methane, carbon disulfide, being above the lower explosion limit at times. These waste gases must undergo purification.

Methods are known where waste gases are treated by adsorption, condensation or oxidation. From among these known methods, only the oxidation method causes a real destruction of noxious substances, since all other methods merely transfer the exhaust air problem to subsequent problems. Since catalytic waste gas oxidation is susceptible to failure, the oxidation method in which the waste gas containing noxious substances is burnt in a burner with combustible additives and the noxious substances oxidized, is being used more and more in the thermal purification of exhaust air.

At present, however, no reliable burner is known which can burn inflammable fuel-air mixtures without possible back-firing into the supply line to a flame arrestor or to the point of origin of the waste gas during the unavoidable variations occurring in practical operation. According to the state of the art, inflammable waste gases must therefore be treated with a supply of diluent air in such a way that they are definitely no longer inflammable when they reach the burner; otherwise the danger of an explosion or a detonation in the supply tubes or the reaction vessel would arise. A flame arrester, such as a fire screen or a submerged safety device for example, is only adapted to arrest momentary back-firing, it does not make continuous operation of a burner with inflammable waste gases possible.

The disadvantages of the known methods of waste gas combustion lie particularly in the high investment and running costs incurred by the expensive safety measures.

It is therefore the object of the present invention to burn inflammable waste gases directly in a burner which prevents back-firing, without the addition of diluent air. According to the present invention, it should be possible for the practical requirements of the produced waste gas, to make the waste gas harmless by back-fire free burning occurring in amounts which vary greatly with time. Finally, according to the present invention for the combustion of inflammable waste gases, a greater extent of safety against explosions should be given by cooperation of a back-fire free burner, of the necessary control technique and of the safety equipment, than is possible by the measures already known in the state of the art.

The object of the present invention is therefore a method for completely and safely purifying waste gases which contain organic or inorganic combustible substances, by thermal decomposition at temperatures between 800° C. and 1000° C., wherein the amounts of exhaust gas vary temporarily within wide limits and the concentration of oxygen and combustible substances also varies in such a way that the lower explosion limit is exceeded in the waste gas at times and wherein supplementary fuel is supplied to maintain the temperature of decomposition if necessary, characterized in that:

(a) a constant amount of fresh air or of waste gas which contains no combustible substances is added to the waste gas to maintain a flow speed $W_o$ as defined in FIG. 3, this constant amount lying somewhere in the range between about 3 to 20% by volume of the maximum amount of the waste gas, (b) the flow of this mixture of waste gases is rendered largely laminar and (c) this largely laminar flowing mixture of waste gases is supplied directly to a combustion chamber, destroying the wall boundary layer directly at the end of the waste gas entrance if reasonable.

The object of the present invention is furthermore a device for the thermal purification of exhaust air in a combustion chamber with gas and if necessary supplementary fuel supply line, in which a flow rectifier is placed in the gas supply line, having an attached nozzle the cross-section of which is contracting in the direction to the combustion chamber, wherein a tear-off edge is placed at the outlet of the nozzle into the combustion chamber.

The method according to the invention makes it possible to burn explosive waste gases without back-fire, wherein the rate of supply of waste gases can vary with the maximum as high as 10, preferably no more than about 5, times the minimum. In the waste gas any combustible noxious substances can be present for example, either substituted or unsubstituted aromatic and/or aliphatic hydrocarbons such as hexane, kerosene, ethylene, toluol, benzene, xylene, chlorobenzene, alcohols such as methanol ethanol, ethers such as diethyl ether, carbon disulfide compounds, such as $CS_2$, hydrogen, acetylene, propylene oxide, ethylene oxide, and the like. The temperature at which the waste gas is fed into the combustion device is between about −40° C. to 100° C. approximately, preferably between about 0° and 40° C.

When the variation in time between the minimum and maximum amounts of the waste gas supplied is large enough for the safety margin as defined in FIG. 3 between the flow velocity of the waste gas in the outlet opening and the back-firing velocity in the operating condition to be maintained, no fresh air or waste gas which contains no combustible substance need be supplied. When the oxygen content of the waste gas is at times below about 10% there may be simultaneously be supplied a constant amount of fresh air having 21% oxygen.

The method and apparatus according to the invention are illustrated in detail in the accompanying drawings, wherein.

Figure 1:
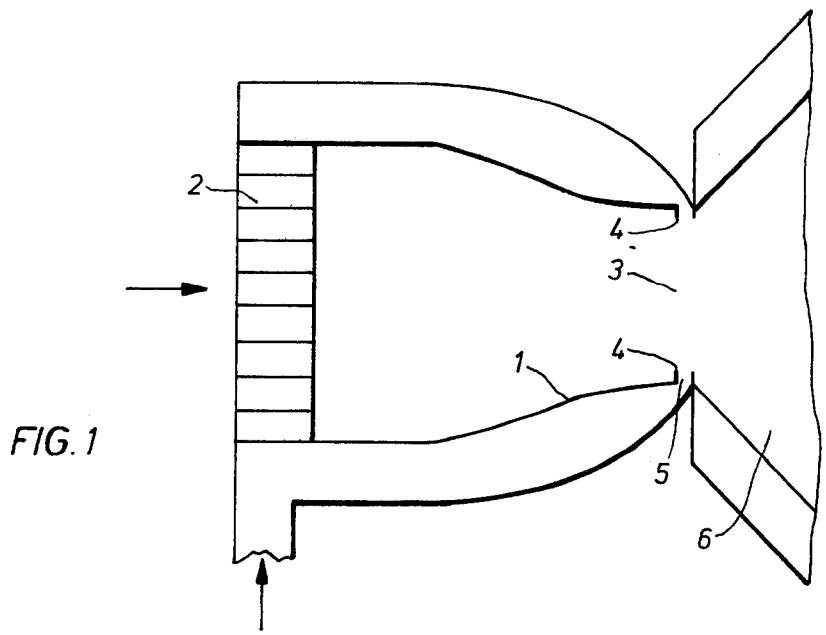
FIG. 1 is a schematic sectional view through one embodiment of a nozzle and combustion chamber in accordance with the invention.

Referring now more particularly to the drawings, the embodiment of FIG. 1 makes it possible to burn waste gases whose amounts vary between 10 and 100% of the maximum amount without back-fire.

In FIG. 1 the reference numerals have the following significance:

1. Nozzle;
2. Flow rectifier, preferably fire screen;
3. Nozzle outlet;
4. Tear-off lining;
5. Supplementary fuel supply;
6. Combustion chamber.

A waste gas containing noxious substances is fed through the flow rectifier 2 into the nozzle 1. Once in the flow rectifier 2 partial laminarization of the waste gas flow ensues, which is further strengthened in the part of the nozzle having a contracting cross-section. Continuous acceleration of the rate of the gas flow in the part of the nozzle having a contracting cross-section ensues. The waste gas in the nozzle which corresponding to its flow is largely twist and vortex-free is fed past a sharp tear-off edge 4 (at the nozzle outlet) into the combustion chamber 6. The fuel additive, if any, for example natural gas, required for obtaining the temperature for decomposing the noxious substances can be fed into the combustion chamber via line 5 outside the nozzle outlet position. The object of the tear-off edge 4 is to destroy largely the boundary layer of flow occurring around the walls of the nozzle, so that back-fire from the combustion chamber into the nozzle 1 is avoided in this comparatively slow-flowing boundary layer. The tear-off edge 4 is about 0.2 to 10 mm, preferably about 1 to 3 mm perpendicular to the main flow direction of waste gas in the nozzle.

The principle according to the invention of this dynamic flame damper is based on the fact that the gas flow velocity must possibly be greater than the actual back-firing velocity of the flame at each point in the narrowest cross-section of the nozzle i.e. including in the wall area. For this purpose the slow boundary layer flow which runs in direct proximity to the wall is destroyed by means of at least one tear-off edge.

In another embodiment which is not illustrated, it is possible to forego the tear-off edge and to accelerate and to laminarize the waste gas into the contracting nozzle to such an extent that the boundary layer has such a slight thickness, that the heat occurring in the boundary layer during back-firing is immediately carried away via the wall (as far as possible metal) which conducts the heat away, whereby the back-firing is interrupted. Whereas in the presence of a tear-off edge on a 70 mm diameter nozzle, the flow rate of the waste gases at the nozzle outlet for waste gases which contain hydrocarbons should amount to something in the region of 2 to 8 meters per sec., preferably about 4 to 5 meters per sec., and for waste gases which contain hydrogen, acetylene should amount to about 20 to 50 meters per sec., the flow rates for waste gases of the first mentioned type must be regulated about 10 to 30% higher at the nozzle outlet if there is no tear-off edge.

The purpose of the nozzle is to produce a flow profile upon acceleration of the waste gas which is as uniform as possible over the entire nozzle cross-section without possible variations occurring in the middle of the nozzle.

Nozzles according to the invention have a diameter from about 2 to 30 cm preferably about 5 to 8 cm at the nozzle inlet, the nozzle outlet having a diameter about one-third of the nozzle inlet diameter. The nozzle diameter is determined according to the minimum and maximum throughput. In any event, with minimum throughput the back-fire velocity must be prevented from exceeding the gas velocity in the direction of the combustion chamber depending on the type of noxious substance and the concentration. The maximum amount determines the maximum pressure loss. In the embodiment described in accordance with the invention, with uniformly regulated and accelerated flow the back-fire velocity is for example about $\leq 3$ m/sec for an approximately stoichiometric hexane/air mixture. The flow rectifier is preferably formed simultaneously as a flame arrrestor, for example as a fire screen which carries off heat, and is preferably situated upstream of the nozzle at a distance corresponding to about 1 to 10 times the diameter of the nozzle inlet. The flame arrrestor serves to prevent back-firing into the waste gas supply line for safety reasons during operating failures. The width of the gaps of the flame arrestor must be cut out by experiments according to penetration strength of the mixture.

When combustion temperatures are maintained from about 800° to 1000° C. in the combustion chamber 6, the noxious organic substances are almost completely oxidized.

Figure 2:
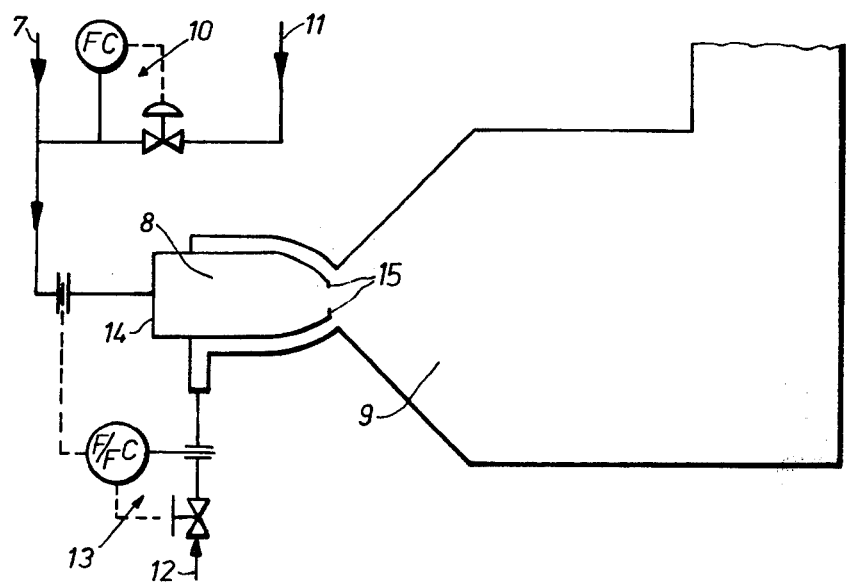
FIG. 2 is a schematic sectional view through a second embodiment.

In the embodiment shown in FIG. 2 purification of inflammable exhaust air or waste gas is possible in accordance with the invention in which the waste gases containing noxious substances can vary between 0 and 100% of the maximum amount with sudden changes.

Figure 3:
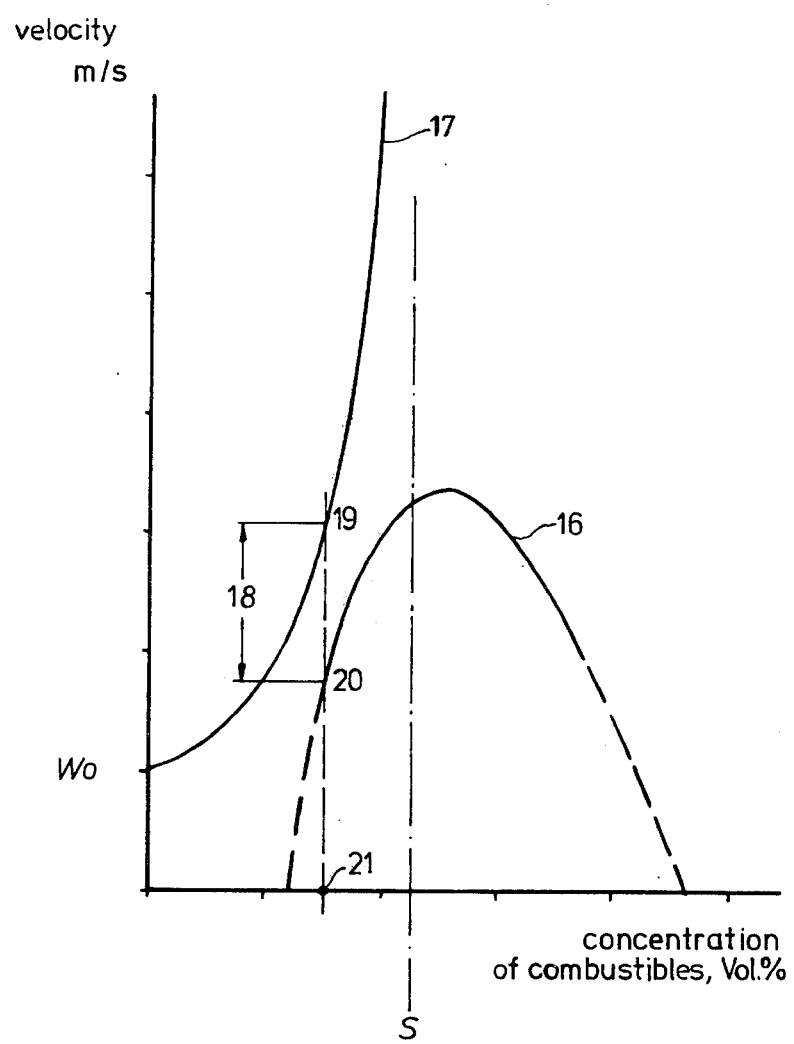
FIG. 3 is a graph showing the safe limits of supply of fresh air or waste gas freed of combustible substances.

In FIGS. 2 and 3 the reference numerals have the following significance:
7. waste gas supply line;
8. nozzle;
9. combustion chamber;
10. closed loop control;
11. flow of fresh air;
12. supplementary fuel supply;
13. closed loop control;
14. nozzle inlet;
15. tear-off edge;
16. flame propagation velocity at nozzle orifice;
17. minimum flow velocity at nozzle orifice;
18. safety margin;
19. flow velocity at minimum safety margin;
20. flame propagation velocity belonging to 19;
21. concentration of combustibles belonging to 19;
S: maximum possible concentration of combustibles in waste gas
Wo: velocity with zero exhaust gas flow In particular the method according to the invention corresponding to FIG. 2 is carried out as follows:

An inflammable exhaust gas passes via line 7 through the nozzle 8 into the combustion chamber 9. A flow of fresh air 11 which is maintained constant is added via a closed loop control 10 (the determination of the amount of fresh air required is dependent on the particular noxious gas as shown in FIG. 3), so that the velocity $W_o$, which is also defined in connection with FIG. 3 below, at the nozzle outlet into the combustion chamber is even maintained during possible decrease to zero exhaust gas flow. Thus it is possible, without exhaust gas analysis, to maintain a minimum temperature of 800° to 1000° C. in the combustion chamber even with random and sudden variation in the exhaust air flow by merely regulating by 13 the ratios of amounts of exhaust air and fresh air (7 and 11) to the amount to supplementary fuel 12, this temperature being suitable for the thermal decomposition of all organic noxious substances in the waste gas.

The inter-relationships shown in FIG. 3 are based on this accomplishment of the method. The flow velocity or the back-fire velocity of the waste gas as shown in m/s (ordinate) varies with the concentration of noxious substance (percentage by volume of combustible substances in the exhaust air or in the fresh air/exhaust air mixture) (abscissa) for a hexane/air mixture (hexane $\triangleq$ noxious substance) for example, in FIG. 3.

The rate of flame propagation in the nozzle flow between the lower and upper explosion limits apart from the concentration and the nozzle diameter is strongly dependent on the laminar or turbulent state of the flow. In order to obtain rates of flame propagation which are determined by the flow and are as small as possible a rectified, calmed and accelerated flow is sought with the nozzle according to the invention. Thus the boundary layer is minimized on the nozzle wall. In addition the boundary layer is torn off if necessary by the sharp edge 15 at the nozzle orifice, that is, the boundary layer becomes infinitely thin at the edge. These measures have the purpose of minimizing the possibilities of back-firing in the boundary layer as far as possible, so that a back-fire velocity which is as slow as possible is obtained for the entire nozzle.

In order to determine the actual back-firing properties of a structurally optimized nozzle for a given noxious substance according to FIG. 1, the variation of the back-firing rate must be experimentally determined in relation to the concentration of the noxious substance.

For this purpose a nozzle according to FIG. 1 is operated with a noxious substance/air mixture which is being produced having varying noxious substance/air ratios within the explosive limits. After regulating a stable combustion condition without back-fire at the nozzle, the flow throughput is reduced until back-firing to the fire screen occurs. The back-fire can be established optically, acoustically or through temperature contact on the flame side of the fire screen. The flow rates in the nozzle at the moment of back-firing are shown in a graph analogous to FIG. 3 varying with the noxious substance concentration and produce a curve analogous to curve 16.

The variation of the flow rate W in the nozzle in relation to the concentration of noxious substances $C_s$ (curve 17, FIG. 3) is produced from the following relationships:

---

1) Air             Exhaust air        Mixture
   $(o' + n')X + (o' + n' + s')Y = V_{mixture}$ $o'$ part by volume oxygen $\longrightarrow$ o concentration in volume oxygen $n'$ part by volume nitrogen $\longrightarrow$ n concentration in volume nitrogen $s'$ part by volume noxious substance $\longrightarrow$ s concentration in volume noxious substance X Fresh air - volumetric flowrate
   Y Exhaust gas - volumetric flowrate
   V Mixture - volumetric flowrate 2) For air $o' + n' = 0.79 + 0.21 = 1$
3) For exhaust gas $o' + n' + s' = 0.79 + 0.21 + s' = 1 + s'$ $\dfrac{o'}{1+s'} + \dfrac{n'}{1+s'} + \dfrac{s'}{1+s'} = 1$ $o + n + s = 1$ 4) $s = \dfrac{s'}{1+s'}$    $s' = \dfrac{s}{1-s}$ By substitution, the following result is obtained from equation 1):

5) $1 X + (1 + 1 + \dfrac{s}{1-s})Y = V_{mixture}$

6) $\dfrac{V_{mixture}}{F_{Nozzle}} = W$ gas velocity in the nozzle (m/s)

(F = nozzle cross-section in m²);

7) $\dfrac{\dfrac{s}{1-s} Y}{V_{mixture}} = C_s$ ($C_s$ = maximum concentration of noxious substance in the air-exhaust air mixture).

---

If the maximum concentration of noxious substances expected in the waste gas is denoted by s, a curve 17 can be calculated for the flow rate with variations of X, Y and $F_{nozzle}$ which has a desired safety interval 18 from the back-firing rate 16 curve. In this way, in accordance with the purpose, advances are made so that various values for $F_{nozzle}$ (nozzle cross-section) and X (fresh air flow rate) are adopted and Y (exhaust air flow rate) varies from 0 to 100%.

In the graph, the ratio of the ordinate values on curve 17, point 19 and curve 16, point 20 for a determined concentration of noxious substance in the fresh air-exhaust air mixture represents the ratio of the rate of flow to the back-fire rate. According to the invention a ratio of about 1.5 or higher is sought.

The curve 17 thus determined cuts the ordinate at $W_o$ whence the required fresh air flow rate is obtained by multiplication with the nozzle area $F_{nozzle}$. This fresh air flow rate usually lies well below the fresh air flow rate which would be required to produce a higher flow velocity than the maximum possible back-fire velocity in the nozzle. Thus a considerable saving in operating costs results.

With the method according to the invention it is possible to completely and safely burn noxious substances in explosive waste gases in a combustion chamber with a reliable varying range of the amount of exhaust air from 0 to 100% with relatively small pressure loss from about 20 m bar.

The method according to the invention is illustrated in the following example:

An arrangement in accordance with FIG. 1 was used, in which the fire screen 2 had a diameter of 150 mm with a screen channel width of 0.7 mm and the nozzle outlet 4 had a diameter of 67 mm.

A hexane-air mixture was substituted as an inflammable exhaust gas. Then, in accordance with the method described above, the curve 16, FIG. 3 was determined for the back-firing velocity of the nozzle. It was shown that the highest back-firing velocity amounted to a value of 3.3 m/s with a hexane concentration of about 2.7% by volume. With a flow velocity of more than 3.3 m/s no back-firing could be established with random concentration. If the flow velocity was lowered, so that the values lay on or below the values of curve 16, back-firing resulted and the flame burnt at the fire screen. The fire screen was not, however, damaged by three minutes' burning at the fire screen.

Curve 17, FIG. 3 was then determined for variations of the values of X, Y and $F_{nozzle}$ and with the establishment of the maximum noxious substance content in the waste gas at s = 2.3%. The result was that at X=0.1 m³/s fresh air supply flow rate and a nozzle cross-section of 0.1 m² a flow of exhaust gas Y between 0 and 3 m³/s could be fed through this nozzle without risk of back-firing. Through the constant flow of fresh air 0.1 m³/s, a rate of $W_o$=1 m/s was obtained without exhaust gas at the nozzle. The curves 16 and 17 have their smallest interval at points 19 and 20 respectively, the ratio of the flow rate (point 19 to point 21) to the back-fire rate (point 20 to point 21) is around 3.1 to 1.75 which equals 1.77. The flow velocity of 3.1 m/s which results for this flow rate of exhaust gas is thus below the maximum flame propagation velocity of 3.3 m/s; nevertheless operation without risk of back-firing is guaranteed since the back-firing velocity of 1.75 m/s resulting for this exhaust gas flow is smaller with a safety margin.

It will be appreciated that the instant specification and example are set forth by way of illustration and not limitation, and that various modifications and changes may be made without departing from the spirit and scope of the present invention.

What is claimed is:

1. In the complete and safe purification of waste gases which contain organic or inorganic combustible substances by thermal decomposition at temperatures between about 800° C. and 1000° C., wherein the amount of waste gas supplied to an inlet varies in time within wide limits and also the concentration of oxygen and combustible substances varies in such a way that the lower explosion limit is at times exceeded in the waste gas and wherein supplementary fuel is optionally added for the maintenance of the decomposition temperature, the improvement which comprises (a) adding to the waste gas to be decomposed fresh air or waste gas which contains no combustible substances in a constant amount which maintains the incoming flow rate $W_o$ defined in FIG. 3 within the range of 3 and 20% by volume of the maximum amount of waste gas, (b) rendering the flow of the waste gas mixture largely laminar and (c) feeding this largely laminar flowing mixture of waste gases directly to a combustion chamber while removing at the inlet orifice an inlet wall boundary layer of a height of 0.2 to 3 mm.

2. The method according to claim 1, wherein the oxygen content of the waste gas is at times <10% and there is simultaneously supplied a constant amount of fresh air having approximately 21% oxygen.

* * * * *